Nov. 21, 1944.   R. L. COMB   2,362,975
HYDRAULIC SEAL
Filed July 13, 1942
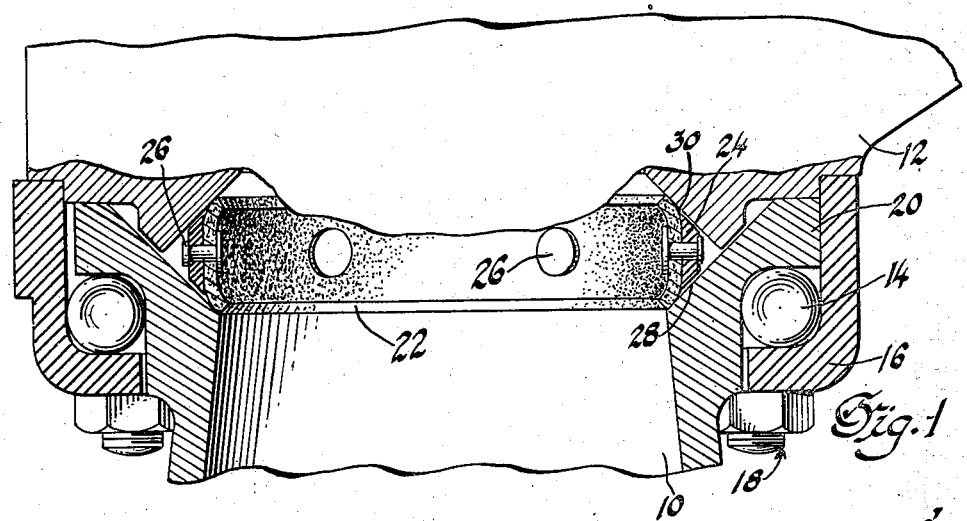
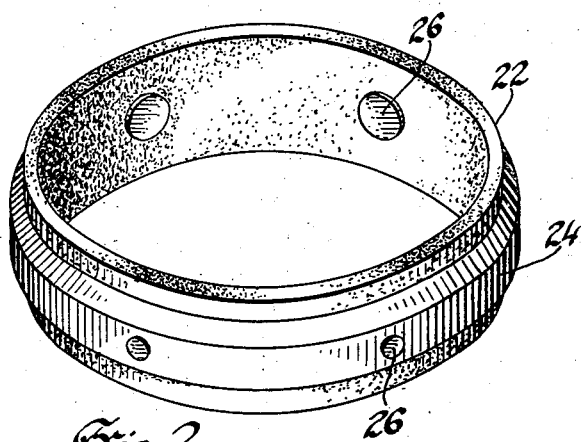
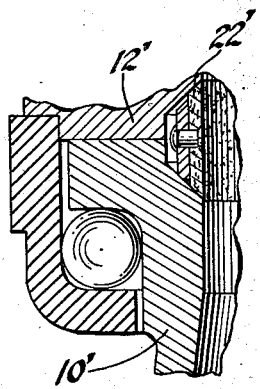
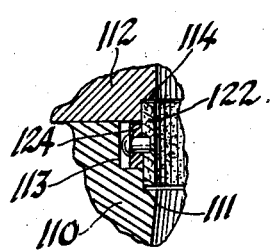
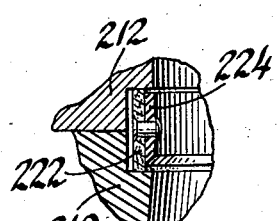
Inventor
Raymond L. Comb
By Luther E. Blazier
Attorney Patented Nov. 21, 1944

2,362,975

UNITED STATES PATENT OFFICE 2,362,975

HYDRAULIC SEAL

Raymond L. Comb, Port Huron, Mich., assignor to Taine G. McDougal, Flint, Mich.

Application July 13, 1942, Serial No. 450,745

3 Claims. (Cl. 285—97.9)

My invention relates to hydraulic sealing of co-operatively moving parts wherein the sealing element is made to fit closely enough with its co-operating surfaces so that no leakage occurs when put into service first following a period of idleness, and on continued operation the enlargement of said seal from moisture absorption and/or hydraulic pressure does not create a waste of energy due to increased friction between the seal and the co-operatively moving parts; and the same consists of an improved method of making an hydraulic sealing structure, effective and yieldable sealing surfaces self-compensating for wear and co-operative with their juxtaposed seat or seats in a manner to provide substantially positive sealing means immediately the device is operated first following an idle inoperative period, and means for effectively preventing during continued operation excessive frictional interference with the relative rotation or indexing of the co-operative elements to be sealed.

My invention in its preferred form consists of a seal ring of suitable flexible material such as leather so confined and compressed in assembly between the co-operating members that its top and bottom edges are each slightly deformed to the approximate contour of the co-operating surfaces of said members, a ring, preferably of brass, encircling the flexible seal ring and having beveled edges paralleling the surfaces of the co-operating members, the seal ring and brass ring being held together by any suitable means such as a series of brass tubular rivets. Although I prefer to use the materials mentioned and to assemble the members in this way, other materials and other methods of assembly may be used for accomplishing the purpose of my invention.

In overhead irrigation of land areas it is usual practice to provide means for index or rotation of the nozzle through which the irrigation water is discharged for distribution. It is also convenient practice to draw the energy, necessary to effect this displacement of the distributing nozzle, from the discharging stream itself; and it follows that that portion of the stream's energy remaining available for effective distribution of irrigating water is greatest where frictional resistance to such displacement is, under all conditions of operation, held to a minimum.

It is also desirable that such seals lend themselves to economical production and that precision machining not be requisite to the desired effectiveness of the seal; in addition, such precision seals do not afford a means of compensating self-adjustment as the contacting surfaces of the co-operative elements wear with use. I therefore prefer to utilize yieldable or flexible materials especially leather, to form a seal between such co-operative elements. However, leather has one undesirable property, in that it swells in contact with water and, conversely, shrinks when the absorbed water is driven off, thereby resulting in objectionable variations in its sealing efficiency.

In actual service, irrigation devices are exposed alternatively to periods of dry warm weather and to periods, when in operation, during which many components, especially sealing rings, are in contact with water and/or under frequently varying degrees of pressure which latter condition especially prevails where the device is of the intermittently discharging type.

Under such cycles of operating conditions, where a leather sealing element is made to fit closely enough with its co-operating surfaces that no leakage occurs when put into service first following a period of idleness, continued operation invariably results in such a degree of enlargement from water absorption and hydraulic pressure that an undue amount of the stream's energy is wastefully absorbed in indexing or rotating the discharging nozzle against the resulting increase in friction. Where the force of the discharging stream against an inclination of the tip of the discharging nozzle has been relied upon to activate rotation, it has occurred that this increase in friction became of such magnitude that the nozzle remained stationary.

On the other hand, should the seal's fit be so made as to meet the leather's enlarged condition, the dried contracted seal fails in its function for an unsatisfactorily long period of initial operation. Indeed, such failure becomes permanent in cases where deformation and displacement of the dry seal by hydraulic pressure, undesignedly admitted between it and its co-operating seat or seats, is such that flow persists through the leakage path so formed.

Such difficulties, in providing a satisfactory hydraulic seal, as have been enumerated above, are aggravated where the discharging stream, impinging against restrictions located down-stream from the seal (such as valve mechanisms or the reduced jet opening of the nozzle), acts to separate the co-operating surfaces of the elements to be sealed.

Reference has been made to overhead irrigation devices of the intermittently discharging type. In conjunction with the operation of such types, hydraulic pressure is relatively slowly accumulated in a compression chamber and only when said pressure reaches a value to cause operation of a pre-set relief valve mechanism does the fluid discharge occur. In operation of such a device it is important to its functioning that no waste or leakage of pressure be permitted inasmuch as in such case the slowly accumulating pressure causing, increasingly severe leakage is not able to build up to that value necessary to actuate the valve-controlled discharge.

Referring now to the drawing for a more complete understanding of my invention:

Figure 1 is a partial vertical section through the mounting of a rotatable nozzle of an irrigation device showing my improved hydraulic seal applied thereto.

Figure 2 is a perspective view of the seal.

Figures 3, 4 and 5 are fragmentary views showing modified forms of seals.

In Figure 1 there is indicated at 10 a stationary portion of the conduit of an irrigation device such as may be used to distribute water. 12 indicates the nozzle rotatably mounted on the top end of the conduit 10, preferably by means of suitable ball bearings, such as shown at 14, held between a bearing race 16 secured to the rotatable nozzle 12 by means of suitable bolts and nuts as indicated at 18, and a co-operating race formed on flange 20 of the fixed conduit 10. The construction so far described is conventional.

My improved hydraulic seal is shown in Figure 2 and consists of a gasket 22 secured inside of a rigid ring 24, preferably of copper or brass, by any suitable means such as rivets as indicated at 26. Gasket 22 is made of suitable yieldable or flexible material such as leather or rubber and extends axially beyond the ring 24 at both ends.

When the seal is in place, as shown in Figure 1, it occupies a recess formed by co-operating beveled surfaces 28 and 30 on the fixed conduit 10 and the rotatable nozzle 12, respectively. The parts are preferably so proportioned that the ends of the yieldable gasket 22 are at all times in sealing engagement with the surfaces 28 and 30 but should they in service become deformed or shrink so that the engagement does not form an effective seal, upon the first rush of water through the conduit and out the nozzle, the hydraulic pressure is sufficient to expand the gasket into good sealing engagement with these surfaces so that no leakage takes place. The ring 24 is preferably held out of engagement with the surfaces 28 and 30, as shown in Figure 1. It performs the important function of reducing the extent of engagement of gasket 22 with these surfaces thereby reducing friction to a sufficient extent to prevent interference with the rotation of the nozzle. Were the ring 24 not used the absorption and/or pressure of the water would tend to expand the gasket 22 into engagement with the fixed and rotating parts to such a degree as to seriously interfere with rotation of the nozzle 12. The ring 24 also performs the function of holding the gasket 22 in sufficiently close sealing engagement so that even though the device should remain unused for a sufficient length of time to permit the gasket to dry it will nevertheless seal the joint between the fixed and rotating parts of the conduit immediately upon flow of water and thereby insure proper operation.

In the modification shown in Figure 3 the gasket 22' is shown with its edges beveled to correspond with the bevel on the engaging corresponding surfaces of the fixed conduit 10' and the rotatable nozzle 12'.

In the modification shown in Figure 4 the fixed conduit 110 is provided with annular stepped grooves 111 and 113 and the rotatable nozzle 112 is provided with a groove 114. In this form of construction the flexible gasket 122 engages the vertical surface of grooves 111 and 114. The gasket is surrounded by a rigid ring 124 which is received in the groove 113 formed in the fixed conduit 110. This form of construction operates substantially the same as the preferred form, the pressure of the water in the conduit insuring good sealing engagement between gasket 122 and the co-operating surfaces of the fixed conduit and rotatable nozzle. The ring 124 controls the amount of engagement of the gasket with the relatively movable parts so that the friction will not be so great as to interfere with the rotation of the nozzle.

In the modification shown in Figure 5 both the stationary conduit 210 and the rotatable nozzle 212 are provided with annular grooves as shown in which is located the flexible gasket 222 shown loosely engaging the horizontal surfaces of the grooves. Upon application of hydraulic pressure the ends of gasket 222 are flexed into engagement with the vertical surfaces of the grooves. In this modification the rigid ring 224 is secured inside the flexible gasket and functions as before to reduce the area of sealing engagement between the gasket and the grooves.

While in all of the modifications the gasket is shown secured to the ring by rivets, these may, if desired, be dispensed with and any other suitable means may be employed to connect them, such for example, cementation, vulcanization, or the like.

In a broad sense the rigid ring constitutes stiffening means for the gasket and if desired such stiffening means could be incorporated within the gasket as by making its central zone stiff and unyielding in any suitable manner.

In actual operation, sealing means embodying my invention has proven to operate in a manner to overcome the undesirable features inherent in conventional seals as enumerated in the description above.

Having thus described and explained my invention I claim and desire to secure by Letters Patent:

1. In a structure of the class described, the combination of a pair of aligned relatively rotatable conduits having abutting bearing faces requiring sealing against the escape of fluid under pressure, said conduits being enlarged interiorly adjacent their abutting faces to provide an annular recess, a substantially flat rigid ring loosely engaging the walls of said recess and overlying portions of both said conduits, and a flexible gasket connected to said ring and extending axially beyond said ring at both its ends into sealing engagement with said conduits, said rigid ring preventing wedging contact between said gasket and the walls of said recess, by ensuring fluid tight sealing contact between said gasket and said walls when said gasket is subjected to pressure of fluid passing through the conduits.

2. The combination of a pair of axially aligned conduits, means for connecting said conduits for relative rotation, means for sealing the joint between the said conduits comprising an annular gasket of yieldable material arranged within said conduits and overlying and having sealing edges disposed on both sides of said joint and having flexible ends in slidable sealing engagement with said conduits, and means associated with said gasket for limiting axial movement thereof and positively holding the central zone thereof out of engagement with said conduits to reduce the contact area and consequently the friction between the gasket and the conduits.

3. In the combination as defined in claim 2, said last-named means comprising a ring of rigid material loosely fitting in said conduits and secured to the central zone of said gasket.

RAYMOND L. COMB.